(12) United States Patent
Van Stralen et al.

(10) Patent No.: US 9,237,755 B1
(45) Date of Patent: Jan. 19, 2016

(54) APPARATUS FOR CARRYING OUT A CLEANING OPERATION APPLIED TO THE INTERNAL NECK SKIN OF SLAUGHTERED POULTRY

(71) Applicant: Meyn Food Processing Technology B.V.

(72) Inventors: Rick Sebastiaan Van Stralen, Oostzaan (NL); Aloysius Christianus Maria Van Steijn, Oostazaan (NL)

(73) Assignee: MEYN FOOD PROCESSING TECHNOLOGY B.V., Oostzaan (NL)

( * ) Notice: Subject to any disclaimer, the term of this patent is extended or adjusted under 35 U.S.C. 154(b) by 0 days.

(21) Appl. No.: 14/791,623

(22) Filed: Jul. 6, 2015

(30) Foreign Application Priority Data

Jul. 9, 2014 (NL) ..................................... 2013153

(51) Int. Cl.
*A22C 21/00* (2006.01)
*A22C 21/06* (2006.01)

(52) U.S. Cl.
CPC .............. *A22C 21/06* (2013.01); *A22C 21/0046* (2013.01)

(58) Field of Classification Search
CPC ............... A22C 21/00; A22C 21/0007; A22C 21/0038; A22C 21/0061; A22C 21/06
USPC ..................... 452/74–77, 81, 83–91, 99, 106, 452/116–119, 173
See application file for complete search history.

(56) References Cited

U.S. PATENT DOCUMENTS

| | | | | | |
|---|---|---|---|---|---|
| 4,788,749 | A | * | 12/1988 | Hazenbroek | A22C 21/06 452/119 |
| 6,213,864 | B1 | * | 4/2001 | Griffiths | A22B 5/0094 452/116 |
| 7,537,515 | B2 | * | 5/2009 | Chattin | A22C 21/06 452/119 |
| 8,858,306 | B2 | * | 10/2014 | Criscione, II | A22B 5/0082 452/173 |
| 8,900,039 | B2 | * | 12/2014 | Drabbels | A22C 21/06 452/116 |
| 2002/0155803 | A1 | | 10/2002 | Tieleman | |

FOREIGN PATENT DOCUMENTS

EP 1247453 B1 10/2002

* cited by examiner

*Primary Examiner* — Richard Price, Jr.
(74) *Attorney, Agent, or Firm* — Dority & Manning, P.A.

(57) ABSTRACT

An apparatus for carrying out a cleaning operation applied to the internal neck skin of slaughtered poultry by removing the windpipe, gullet, glandular tissue or remainders thereof.

9 Claims, 4 Drawing Sheets

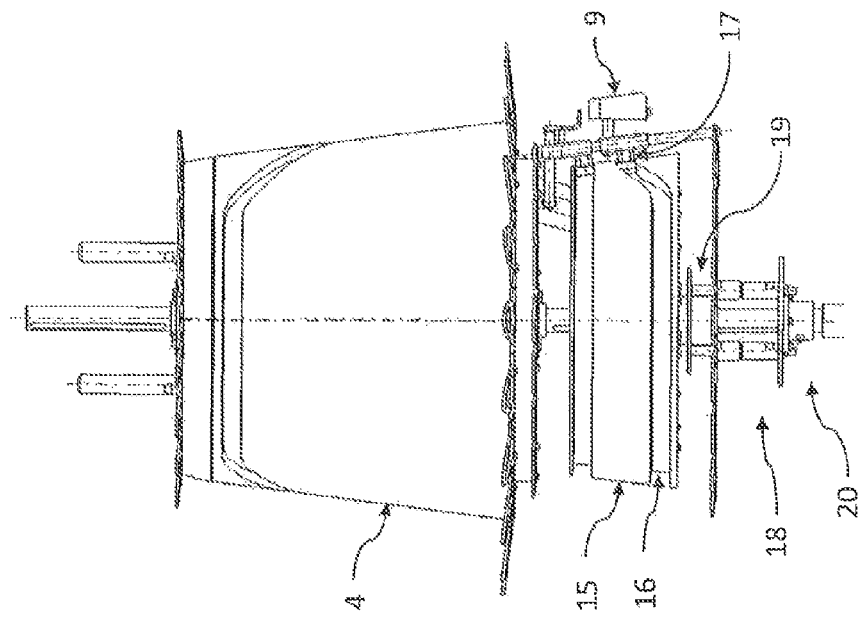
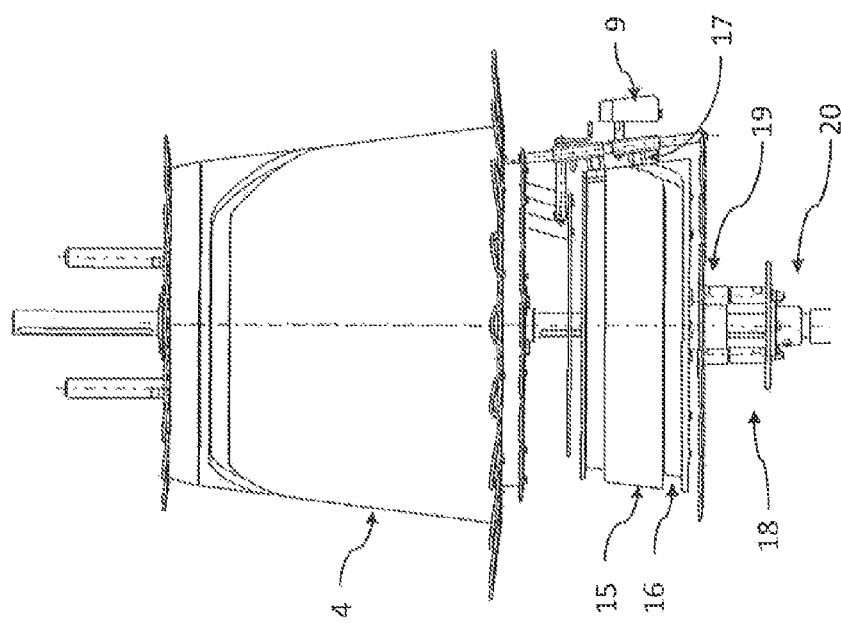

APPARATUS FOR CARRYING OUT A CLEANING OPERATION APPLIED TO THE INTERNAL NECK SKIN OF SLAUGHTERED POULTRY

PRIORITY STATEMENT

The present application claims priority under 35 U.S.C. §119 to Dutch Application No. 2013153, filed Jul. 9, 2014.

FIELD OF THE INVENTION

The invention relates to an apparatus for carrying out a cleaning operation applied to the internal neck skin of slaughtered poultry by removing the windpipe, gullet, glandular tissue or remainders thereof.

BACKGROUND OF THE INVENTION

An apparatus is known from EP-B-1 247 453 and includes suspension devices for suspending the poultry by the legs. A first drum which at its periphery is provided with a first curve formed by a first groove. This groove is traced by a first projection that connects to a rotatable organ bore so as to arrange that movement of the organ bore along the periphery of the first drum causes the organ bore to be inserted from the top into the poultry being suspended by the legs for carrying out the cleaning operation.

The known apparatus further has presser means including a presser chock, which during the cleaning operation rests against the neck skin of the poultry at the breast side and pushes the neck skin of the poultry towards the organ bore. The presser chock cooperates with a second drum provided with a second groove that is being traced by a second projection connected with the pressure chock so as to arrange that the pressure chock is adjustable in height due to its movement along the periphery of the second drum. By arranging that the presser chock is adjustable in height, the pressure chock can be moved upwards at the beginning of the cleaning operation until it reaches a position wherein the pressure chock rests against the neck skin at the breast side of the poultry.

The presser chock effectively assists the scraping action of the organ bore so that its efficacy is improved. The presser chock pushing the poultry's neck skin on the breast side towards the organ bore assists in particular the effective removal of the windpipe, which, due to the nature of the tissue of which the windpipe consists, is usually difficult to remove by means of the organ bore.

It is known that the measure with which the neck skin is pressed against the organ bore is as such quite critical, since on the one hand the scraping action of the organ bore needs to be supported, while on the other hand the scraping action must not result in the neck skin being torn. It is known that an appropriate amount of pressure may be obtained if the presser chock is arranged to move upwards at the beginning of the cleaning operation until it is in a position wherein the presser chock slightly lifts the poultry while the same is suspended by the legs in the hooks. Although this arrangement allows for a considerable tolerance with regard to any possible differences in size of the poultry to be processed, practice learns that poultry sizes may differ more than can be accommodated with the arrangement known from EP-B-1 247 453.

It is remarked that from US2002/0155803 a carousel type machine is known that has a series of holding fixtures that revolve about a central axis of the machine at the same speed as a conveyor line brings carcasses suspended by their hocks to the machine. The holding fixtures are driven by a first drum and grip the carcasses by the thighs to lift them up against a stop until the tail bones are firmly seated against a stop to establish a point of reference for a processing organ that is driven by a second drum that is movable with respect to the first drum along a shared shaft. In the particular embodiment disclosed in US2002/0155803, the processing tool is a cutter in the form of a knife for making an opening cut into the body cavity of the carcass through the abdominal skin. An alternative embodiment of processing tool may include a vent cutter, for example, for cutting the vent from the carcass prior to making the opening cut. US2002/0155803 further mentions that the principles as disclosed in it encompass both such types of processing tools, and other types not specifically mentioned therein. However, this very general statement regarding the possible application to other types of processing tools does not provide any pointer, hint, or suggestion that would (instead of could) logically and inevitably lead to the application of the features of the characterizing portion of the main claim in an apparatus for carrying out a cleaning operation applied to the internal neck skin of slaughtered poultry.

It is therefore an object of the invention to make the cleaning operation also effective with notable size differences of poultry beyond what can be accommodated with the known apparatus, and to improve the scraping action and arrange that poultry of any size may be stripped reliably of windpipe, gullet and other tissue that is to be removed.

SUMMARY OF THE INVENTION

In a first exemplary embodiment of the invention, the first drum and the second drum have an adjustable distance with respect to each other. The adjustable distance of the first drum, which is operably connected with the rotatable organ bore in relation to the second drum that is operably connected with the pressure chock, is an effective means to accommodate the apparatus to an exceptionally large range of poultry sizes.

Preferably the first drum and the second drum are rotationally adjustable with respect to each other. This measure can be applied independent from the adjustable distance of the first drum and the second arm with respect to each other, or in addition to the measure. In both situations this provides a perfect tuning in time that can be accomplished as to when the rotatable organ bore has to enter and process the poultry depending on the size of the poultry. Otherwise inaccuracies may occur or remain due to the fact that the movements of the rotational organ bore and the pressure chock are independently determined by the trajectories of the grooves in the respective drums of the organ bore and the pressure chock. The relative position of the trajectories with respect to each other therefore preferably has to be attuned to the size of the poultry, particularly with notable size differences of the poultry. In this connection it is advantageous for realizing a high level of accuracy that the adjustable distance and/or the rotational position of the first drum and the second drum is/are continuously adjustable within a predefined range.

A suitable embodiment of the apparatus of the invention has the second drum mounted on a mechanism include at least two parts, wherein the two parts of the mechanism are adjustable regarding their mutual distance and regarding their rotational position with respect to each other.

Advantageously the two parts of the mechanism are connected with each other through actuators, preferably linear actuators. Preferably the actuators are hydraulic cylinders. Such hydraulic cylinders are simple and cost effective means to arrange for the mutual displacement of the two parts of the mechanism.

It is further preferred that the second drum is mounted on a first axle of a first part of the mechanism that is rotatably mounted on a second part of the mechanism, which first axle cooperates with a rotationally fixed second axle which is further fixed against longitudinal displacement. The first axle and the second axle have a joint longitudinal body axis, wherein the first axle and the second axle have cooperating splines and projections to arrange that, with variation of the distance of the two parts of the mechanism, a longitudinal displacement of the first axle with respect to the second axle occurs causing a simultaneous rotation of the first axle with respect to the second axle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention. The invention will now be explained in more detail with reference to figures illustrating a non-limiting, exemplary embodiment. The apparatus of the invention is embodied with one or more of the appended claims.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 6A and 6B show in a detail side view the drum operably connected with the pressure chock at a first and at a second altitude.

The use of identical or similar reference numerals in different figures denotes identical or similar features.

DETAILED DESCRIPTION OF THE INVENTION

Figure 1:
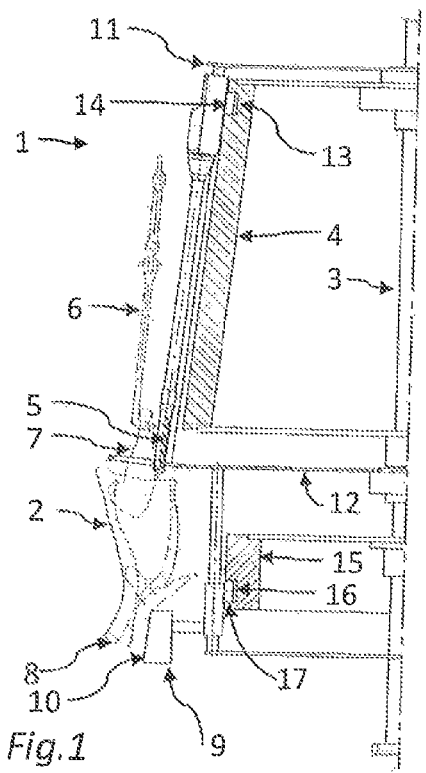
FIGS. 1 to 4 illustrate a number of successive settings of an exemplary apparatus for carrying out a cleaning operation applied to the internal neck skin of slaughtered poultry as proposed by the invention.

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

The exemplary apparatus 1 shown in the figures for carrying out a cleaning operation applied to the internal neck skin of slaughtered poultry 2 includes a first drum 4 and a central axis 3 pertaining to the first drum 4. Along the first drum 4, movable organ bores 5 are provided. One such organ bore 5 is shown in FIGS. 1-4. To facilitate their activation, the organ bores are in their longitudinal direction movably mounted on rods, which are fastened to an upper plate 11 and a lower plate 12, rotatable about the axis 3.

The upper plate 11 may, for example, be driven by a chain such that the organ bores 5 are moved along the drum 4. The periphery of the first drum 4 is provided with a curve formed by a first groove 13, which is being traced by a first projection 14 that is part of the organ bore 5. In this way, the movement of the organ bore 5 along the first drum 4 also results in the organ bore 5 making a movement in its longitudinal direction determined by the curve of the first groove 13, while at the same time a further mechanism causes the organ bore 5 to rotate during the longitudinal movement.

As further shown in the FIGS. 1-4, the poultry 2 is suspended by the legs from suspension devices 6, for example, hooks.

While the poultry 2 is suspended by the legs 7 from the hooks, moving in correspondence with the movement of the organ bores 5 along the first drum 4, the organ bore 5 is activated in the manner explained above as soon as the same moves from the top into the poultry 2 (see FIGS. 1 and 2, respectively), after which it moves such as to exit the poultry 2 via a neck end 8.

The exemplary apparatus is further provided with presser means 9 in the form of a presser chock, which is placed from below, against the neck skin of the poultry 2 at the breast side. In this position, which is illustrated in FIG. 2, the presser chock 9 pushes the neck skin of the poultry towards the organ bore 5 such as to enable the latter to effectively scrape the inside of the neck skin of the poultry 2.

With the presser chock 9 supporting the neck skin from the outside, the internal neck skin can be effectively cleaned when the neck opening 8 is very large, thereby also allowing difficult tissue to be removed. This relates in particular to the windpipe. FIGS. 2 and 3 show that a small space remains between the organ bore 5 and the presser chock 9, between which the neck skin of the poultry 2 can be accommodated so that the cleaning operation to be carried out with the organ bore 5 will not damage the neck skin.

The figures show that the organ bore 5 is disposed at a slight slant. The presser chock 9 has a work surface 10 that corresponds with the slanting disposition of the organ bore 5. In an equally possible completely perpendicular disposition of the organ bore 5, the work surface 10 of the presser chock 9 should be disposed correspondingly perpendicular.

Figure 2:
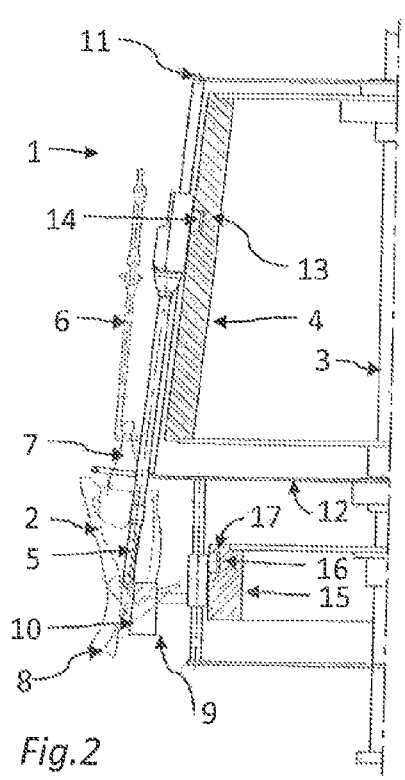
Figure 3:
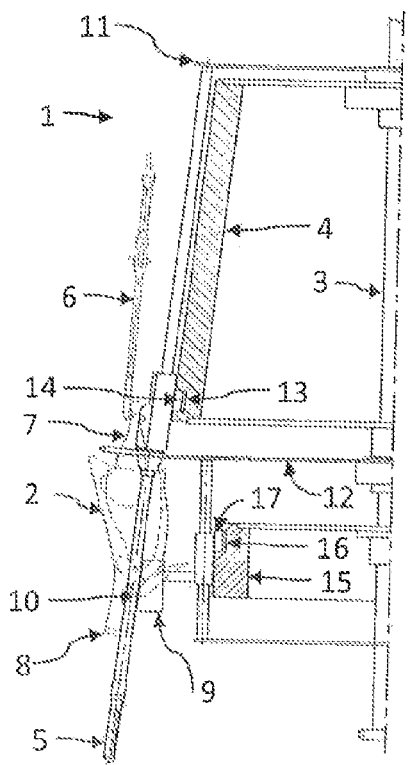

FIGS. 2 and 3 show the situation following the start of the cleaning operation, when the organ bore 5 is moving downwards and the presser chock 9 is moved upwards from the initial position shown in FIG. 1, until it assumes a position wherein the presser chock 9 rests against the neck skin at the breast side of the poultry, supporting the same. This is caused by the arrangement that the presser chock 9 cooperates with a second drum 15 provided with a second groove 16 which is being traced by a second projection 17 connected with the pressure chock 9. By this arrangement the pressure chock 9 is automatically adjusted in height when it moves past the periphery of the second drum 15.

Figure 4:
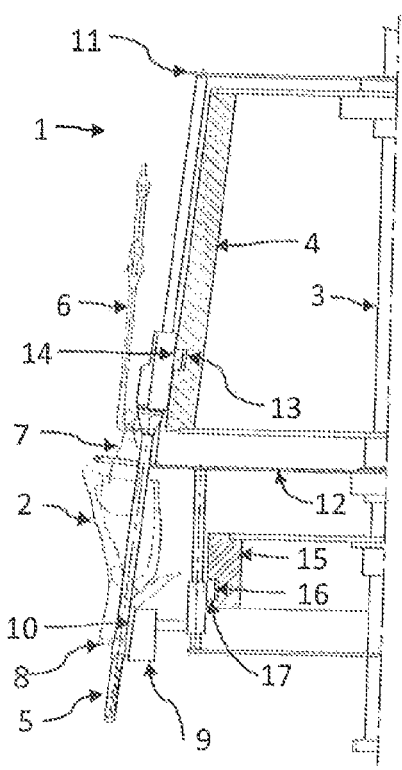

FIG. 4 shows that the organ bore 5 has completed the cleaning operation after which it will return to the starting position as shown in FIG. 1. In that situation, the presser chock 9 is also returned to the initial position of FIG. 1, so that the poultry 2 is then again suspended from the hooks 6 by the legs 7 only.

Figure 5:
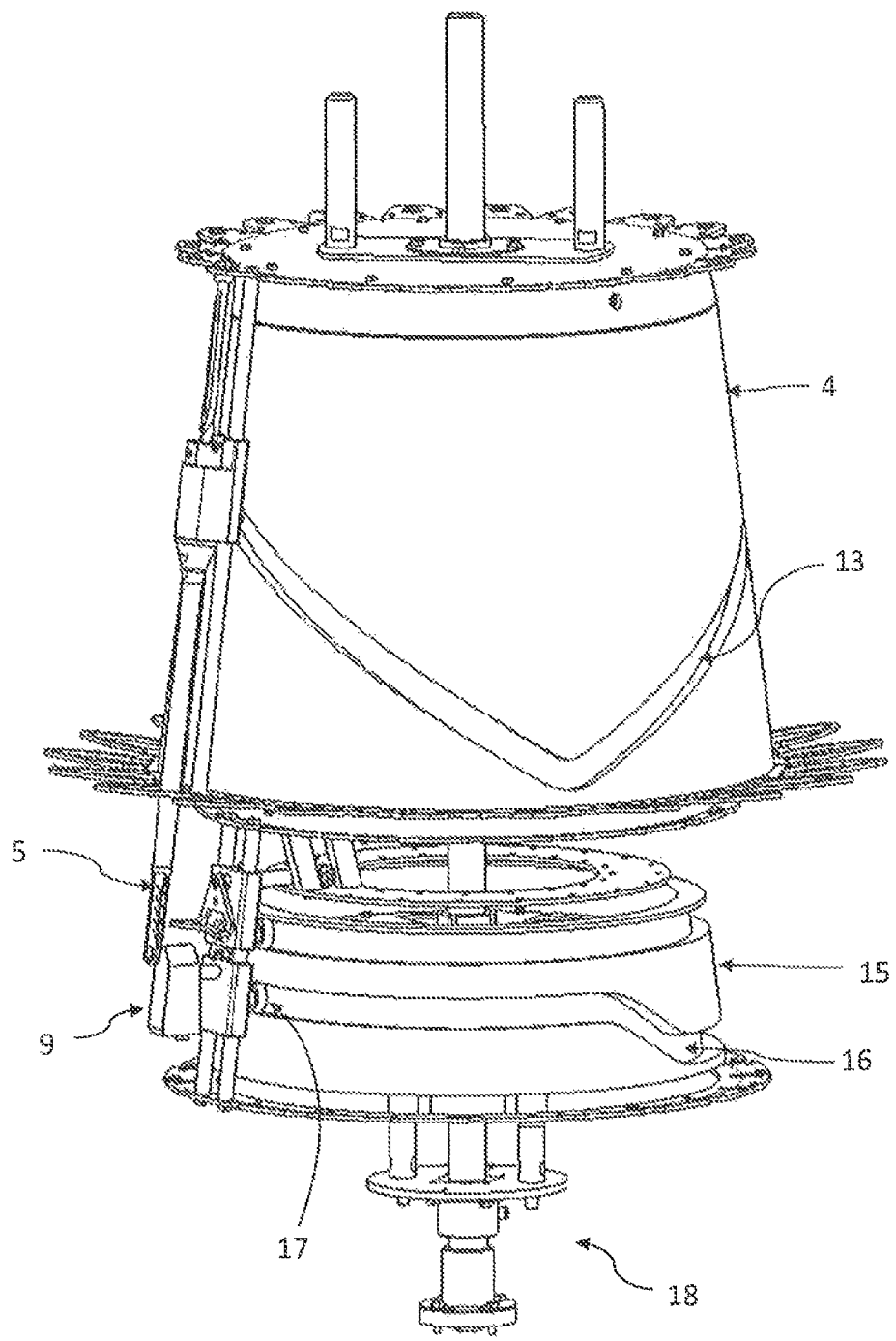
FIG. 5 shows in an isometric side view the two drums of the exemplary apparatus of the invention.

FIG. 5 provides an isometric side view of the exemplary apparatus 1 of the invention providing a clearer view at the first drum 4, which at its periphery is provided with a first curve formed by a first groove 13. This groove 13 is traced by a first projection (not visible) that connects to a rotatable organ bore 5 in order to arrange that when the organ bore 5 moves along the periphery of the first drum 4, the organ bore 5 is moved downwards and inserted from the top into the poultry to be processed. Likewise after the poultry is processed, the organ bore 5 moves upwards again.

FIG. 5 also provides a clear view at the presser chock 9 that cooperates with a second drum 15 that is provided with a second curve formed by a second groove 16. This second groove 16 is being traced by a second projection 17 connected with the pressure chock 9 so as to arrange that the pressure chock 9 is adjustable in height due to its movement along the periphery of the second drum 15.

According to the invention the first drum 4 and the second drum 15 have an adjustable distance with respect to each other as is illustrated in FIG. 6A and FIG. 6B. Comparing FIG. 6A with FIG. 6B reveals that the second drum 15 that is operably connected with the pressure chock 9 assumes a lower position in FIG. 6A than it does in FIG. 6B. With the first drum 4 being at a fixed altitude with reference to the fixed world, this brings about that the distance between the first drum 4 that connects to the rotatable organ bore 5, and the second drum 15 that connects to the pressure chock 9 is variable. Preferably at the same time the first drum 4 and the second drum 15 are rotationally adjustable with respect to each other.

Both FIGS. 6A and 6B show an exemplary embodiment in which the second drum 15 is mounted on a mechanism 18 including at least two parts 19, 20, wherein the two parts of the mechanism 18 are adjustable regarding their mutual distance and regarding their rotational position with respect to each other. This is shown clearer in FIG. 7.

Figure 7:
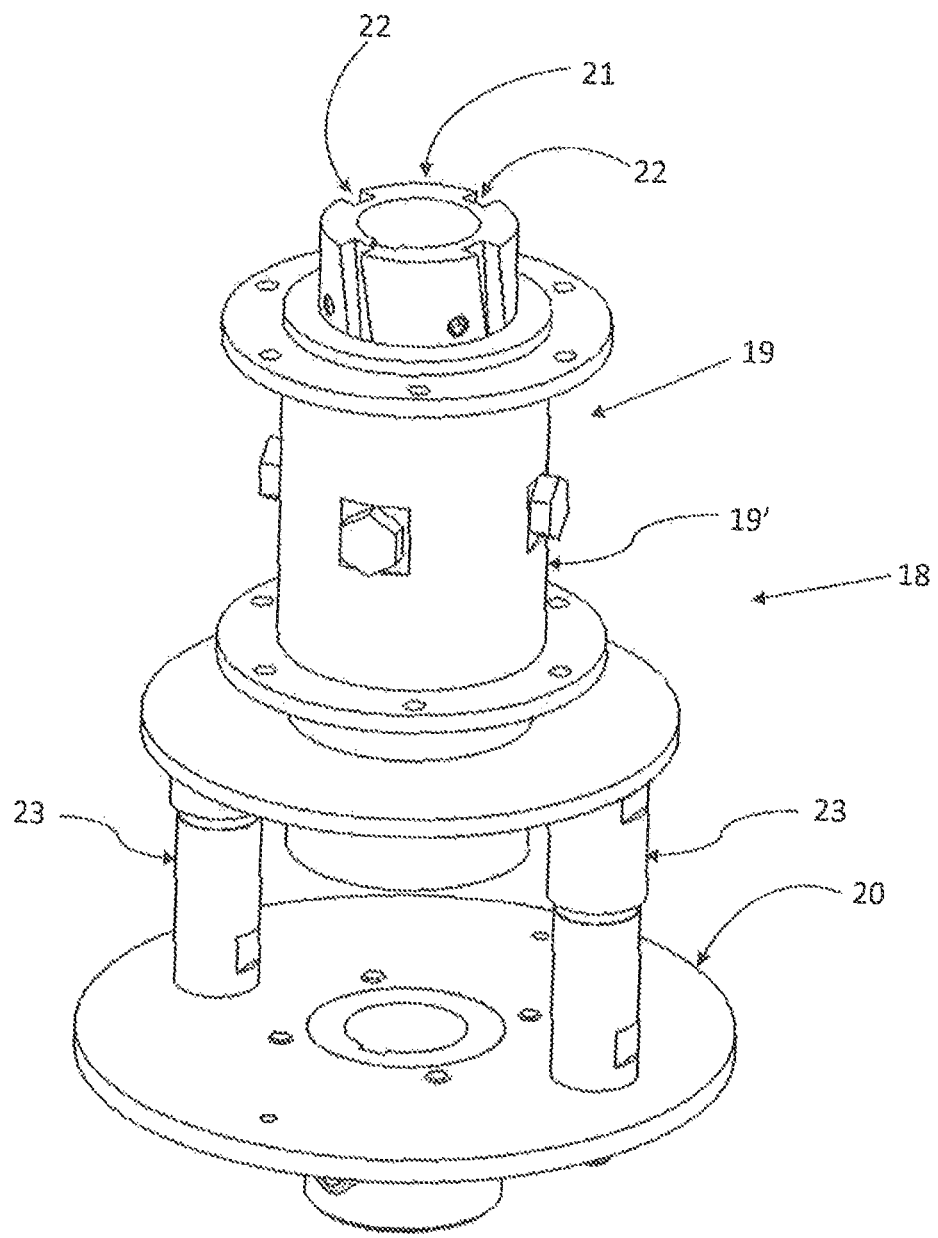
FIG. 7 shows an isometric view of the exemplary mechanism that is used for mounting the drum that is operably connected with the pressure chock.

FIG. 7 shows that the two parts 19, 20 of the mechanism 18 are connected with each other through (preferably linear) actuators 23, particularly hydraulic cylinders. The mechanism 18 includes a first axle 19' of a first part 19 of the mechanism 18 on which the second drum 15 is to be mounted. The first part 19 is rotatably mounted on a second part 20 of the mechanism 18. The first axle 19' of the first part 19 further cooperates with a rotationally fixed second axle 21, which is also fixed against longitudinal displacement.

FIG. 7 further shows that the first axle 19' and the second axle 21 have a joint longitudinal body axis and cooperating splines 22 and (nonvisible) projections to arrange that with variation of the distance of the two parts 19, 20 of the mechanism 18, a longitudinal displacement of the first axle 19' with respect to the second axle 21 occurs causing a simultaneous rotation of the first axle 19' with respect to the second axle 21. Due to the fact that the second drum 15 is mounted on the first axle 19', varying the distance between the first part 19 and the second part 20 of the mechanism 18 results in a simultaneous variation of the altitude of the second drum 15 and of its rotational position with reference to the fixed axle 21. In this way a very effective and robust apparatus is provided that can be accommodated to processing of poultry in a large range of sizes.

Although the invention has been discussed in the foregoing with reference to an exemplary embodiment of the apparatus of the invention, the invention is not restricted to this particular embodiment which can be varied in many ways without departing from the gist of the invention. It is, for example, possible to provide a fixed altitude for the second drum, and make the first drum that is operably connected with the rotatable organ bore variable in height and rotational position with reference to the second drum. The discussed exemplary embodiment shall therefore not be used to construe the appended claims strictly in accordance with this exemplary embodiment. The exemplary embodiment is merely intended to explain the wording of the appended claims without intent to limit the claims to the particular features of this exemplary embodiment. The scope of protection of the invention shall therefore be construed in accordance with the appended claims only, wherein a possible ambiguity in the wording of the claims shall be resolved using this exemplary embodiment.

What is claimed is:

1. An apparatus for carrying out a cleaning operation applied to the internal neck skin of slaughtered poultry by removing a windpipe, gullet, glandular tissue or remainders thereof, the poultry including legs by which the poultry is suspended, the apparatus comprising:
   suspension devices for suspending the poultry by the legs;
   a rotatable organ bore;
   a first drum having a periphery provided with a first curve formed by a first groove traced by a first projection that connects to the organ bore so as to arrange that movement of the organ bore along the periphery of the first drum causes the organ bore to be inserted from into a top of the poultry;
   presser means comprising a presser chock, which during the cleaning operation rests against the neck skin of the poultry at a breast side and pushes the neck skin of the poultry towards the organ bore;
   wherein the presser chock cooperates with a second drum provided with a second curve formed by a second groove traced by a second projection connected with the pressure chock so as to arrange that the pressure chock is adjustable in height by its movement along the periphery of the second drum; and
   wherein the first drum and the second drum have an adjustable distance with respect to each other.

2. The apparatus for carrying out a cleaning operation as in claim 1, wherein the first drum and the second drum are rotationally adjustable with respect to each other.

3. The apparatus for carrying out a cleaning operation as in claim 1, wherein the second drum is mounted on a mechanism comprising at least two parts, wherein the two parts of the mechanism are adjustable regarding their mutual distance and regarding their rotational position with respect to each other.

4. The apparatus for carrying out a cleaning operation as in claim 1, wherein the first drum and the second drum are rotationally adjustable with respect to each other, and wherein the adjustable distance, the rotational position, or both, of the first drum and the second drum are continuously adjustable within a predefined range.

5. The apparatus for carrying out a cleaning operation as in claim 1, wherein the second drum is mounted on a mechanism comprising at least two parts, wherein the two parts of the mechanism are adjustable regarding their mutual distance and regarding their rotational position with respect to each other, and wherein the two parts of the mechanism are connected with each other through actuators.

6. The apparatus for carrying out a cleaning operation as in claim 5, wherein the two parts of the mechanism are connected with each other through linear actuators.

7. The apparatus for carrying out a cleaning operation as in claim 6, wherein the actuators are hydraulic cylinders.

8. The apparatus for carrying out a cleaning operation as in claim 7, wherein the second drum is mounted on a first axle of a first part of the mechanism which is rotatably mounted on a second part of the mechanism, and wherein the first axle cooperates with a rotationally fixed second axle that is further fixed against longitudinal displacement, wherein the first axle and the second axle have a joint longitudinal body axis; and wherein the first axle and the second axle have cooperating splines and projections to arrange that with variation of the distance of the two parts of the mechanism a longitudinal displacement of the first axle with respect to the second axle occurs causing a simultaneous rotation of the first axle with respect to the second axle.

9. The apparatus for carrying out a cleaning operation as in claim 1, wherein the organ bore is disposed at a slant and the presser chock has a work surface that corresponds with a slanting disposition of the organ bore.

\* \* \* \* \*